US011126837B1

(12) United States Patent
Savalia et al.

(10) Patent No.: US 11,126,837 B1
(45) Date of Patent: Sep. 21, 2021

(54) COMPUTERIZED RECOGNITION OF CHECKBOXES IN DIGITIZED DOCUMENTS

(71) Applicant: Automation Anywhere, Inc., San Jose, CA (US)

(72) Inventors: Yogesh Savalia, Vadodara (IN); Mukesh Methaniya, Vadodara (IN); Nakuldev Patel, Vadodara (IN); Priti Sundar Hazra, Vadodara (IN); Derek S. Chan, San Jose, CA (US)

(73) Assignee: Automation Anywhere, Inc., San Jose, CA (US)

( * ) Notice: Subject to any disclaimer, the term of this patent is extended or adjusted under 35 U.S.C. 154(b) by 160 days.

(21) Appl. No.: 16/655,514

(22) Filed: Oct. 17, 2019

(51) Int. Cl.
*G06K 9/00* (2006.01)
*G06K 9/32* (2006.01)
*G06T 11/60* (2006.01)

(52) U.S. Cl.
CPC ..... *G06K 9/00463* (2013.01); *G06K 9/00449* (2013.01); *G06K 9/3241* (2013.01); *G06T 11/60* (2013.01)

(58) Field of Classification Search
CPC ..................................................... G06T 11/60
See application file for complete search history.

(56) References Cited

U.S. PATENT DOCUMENTS

2011/0255789 A1  10/2011  Neogi et al.
2017/0286803 A1  10/2017  Singh et al.

OTHER PUBLICATIONS

K. Simonyan, A. Zisserman, Very Deep Convolutional Networks for Large-Scale Image Recognition, Visual Geometry Group, Department of Engineering Science, University of Oxford, arXiv: 1409.1556v6 [cs.CV] Apr. 10, 2015.
Min Lin, Qiang Chen, Shuicheng Yan, Network in Network, Graduate School for Integrative Sciences and Engineering, Department of Electronic & Computer Engineering, National University of Singapore, Singapore, arXiv:1312.4400v3 [cs.NE] Mar. 4, 2014.

*Primary Examiner* — Ross Varndell

(57) ABSTRACT

A system that automatically recognizes checkboxes within a document and extracts the contents thereof. A user views a digitized document and annotates the document by identifying checkboxes contained in the document, by way of visually perceptible bounding boxes. The annotated document is processed by a machine learning engine that employs multiple convolutional operations followed by a global average pooling layer, a fully connected layer with 1024 node and 'ReLU' activation, a fully connected layer with 2 node and 'softmax' activation. The identified checkboxes and their contents are stored as label-value pairs, where the label identifies the checkbox and the value identifies the value of the checkbox, which can be either Yes, No, or No checkbox found.

18 Claims, 14 Drawing Sheets

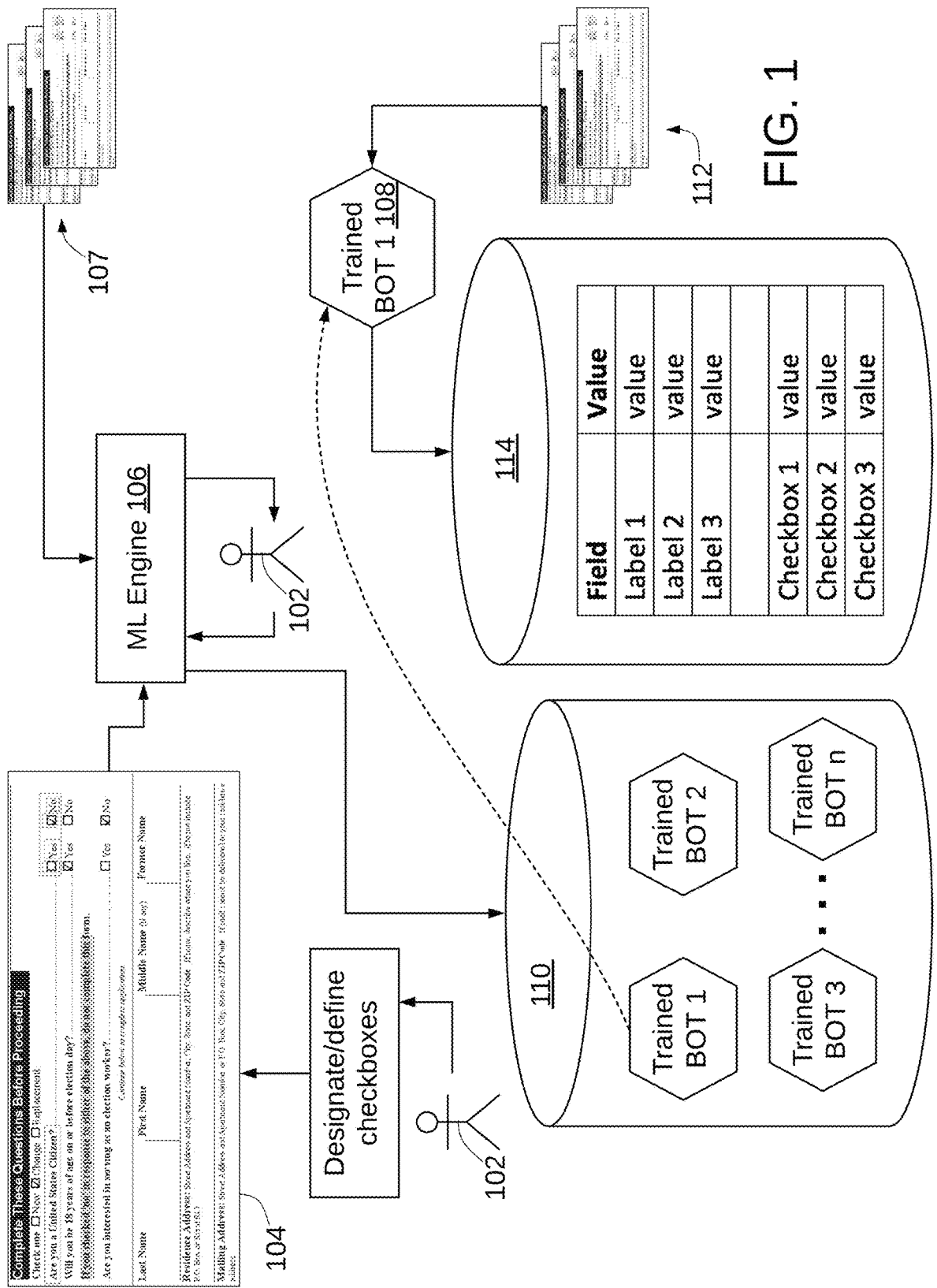

Complete These Questions Before Proceeding

Check one ☐ New ☑ Change ☐ Replacement
　　　　　　　　　　　　　　└─ 202

Are you a United States Citizen? ☐ Yes ☑ No ─── 203

Will you be 18 years of age on or before election day? ☑ Yes ☐ No

If you checked 'no' in response to either of the above, do not complete this form.

Are you interested in serving as an election worker? ☐ Yes ☑ No

*Continue below to complete application.*

Last Name　　　　　　First Name　　　　　　Middle Name (If any)　　　　　　Former Name

Residence Address: Street Address and Apartment Number, City, State, and ZIP Code. If none, describe where you live. (Do not include P.O. Box or Rural Rt.)

Mailing Address: Street Address and Apartment Number or P.O. Box, City, State and ZIP Code. If mail cannot be delivered to your residence address.

FIG. 2

Review group 2033 mapping  CheckBox.jpg  *View each Group 2033 document*

To train a group:
- Click each field (left panel) to verify the label and value (center panel) is the same as the document (right panel).
- Preview the mapping after all fields are verified.
- Save and go to the next group.

| Fields | Field - US Yes | |
|---|---|---|
| ☑ United Citizen | Data type | |
| ☑ US Yes | checkbox | |
| ☑ US No | text | |
| ☑ Gender | date | |
| ☑ Male | number | |
| ☑ Female | selection | |
| ☑ Are you adult | checkbox group | |
| ☑ Adult Yes | Field value | |
| ☑ Adult No | No | |
| ☑ Tx Driver License | Checkbox group (optional) | |
| ☑ Social security number | United Citizen | |
| | Field options | |

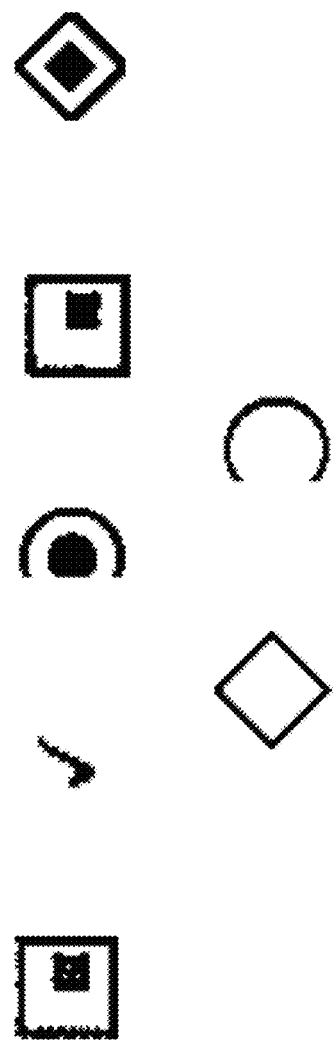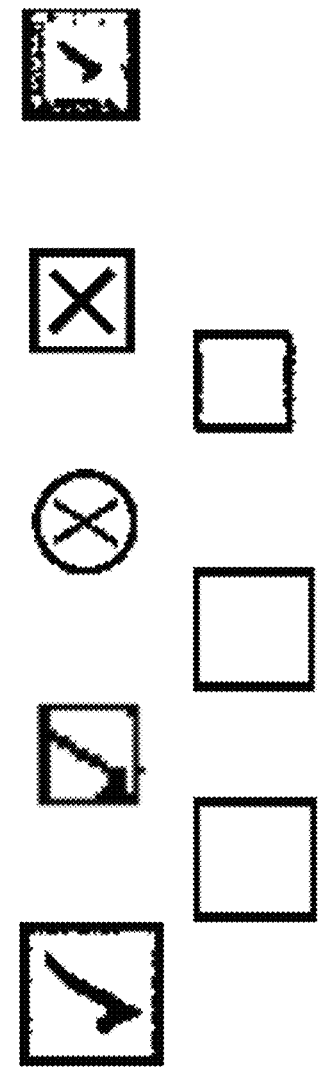

COMPUTERIZED RECOGNITION OF CHECKBOXES IN DIGITIZED DOCUMENTS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE DISCLOSURE

This disclosure relates generally to the field of data processing systems and more particularly to document recognition.

BACKGROUND

Accurate identification and extraction of data from business documents is an important aspect of computerized processing of business documents. Business documents can be structured in a variety of ways with many documents being "semi-structured" meaning that certain portions of a document may be highly structured, with other portions being unstructured which can include an image and/or text. Many documents are received in an image encoded form (such as PDF, TIFF) and many documents that are received in paper form are converted to an image encoded form for storage and processing. The electronic information regarding formatting of such documents is therefore not available and the information must either be manually reviewed and manually inputted into a computer application or the formatting of the document must be automatically or semi-automatically recognized in order to permit automated identification and understanding of the contents of the document.

Checkboxes are a commonly used information gathering technique, where information can be provided by selecting, or not selecting, a checkbox. This permits simplified inputting of information in a regular manner that normalizes responses by reducing or eliminating the subjectivity inherent in free form responses to questions. Checkboxes may take a number of different shapes (square, circle) and may be fully enclosed or partially enclosed (such as parentheses ( ), brackets [ ] or braces { }) and may be selected or filled in in a variety of manners such as by inserting a check (✓) an x, other symbol (-, /, *, \), or shading the entire box. Given the aforementioned variety, accurate recognition of the existence of a checkbox, and whether it is filled in, can be challenging. This is particularly challenging given the variations among documents. Moreover, variations in printing (e.g. different print resolutions, ink types and paper types) and scanning of printed documents (different scanning resolution, inaccurate paper feeding, artifacts introduced by the scanner) make accurate automated recognition of checkboxes and the contents within challenging even in multiple instances of the same type of document.

SUMMARY

The disclosed system, method and computer readable medium automatically recognizes checkboxes within a document and extracts the contents thereof. A user views a digitized document and annotates the document by identifying checkboxes contained in the document, by way of visually perceptible bounding boxes. The annotated document is processed by a machine learning engine that employs multiple convolutional operations followed by a global average pooling layer, a fully connected layer with 1024 node and 'ReLU' activation, a fully connected layer with two node and 'softmax' activation. The identified checkboxes and their contents are stored as label-value pairs, where the label identifies the checkbox and the value identifies the value of the checkbox, which can be either Yes, No, or No checkbox found.

These and additional aspects related to the invention will be set forth in part in the description which follows, and in part will be apparent to those skilled in the art from the description or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive techniques disclosed herein. Specifically:

FIG. 1 is a high-level block diagram of an embodiment of a checkbox extraction system.

FIG. 2 depicts a digitized image of a document containing checkboxes bounded by a user.

FIGS. 6A and 6B illustrate images of various types of checkboxes.

DETAILED DESCRIPTION

Figure 3:
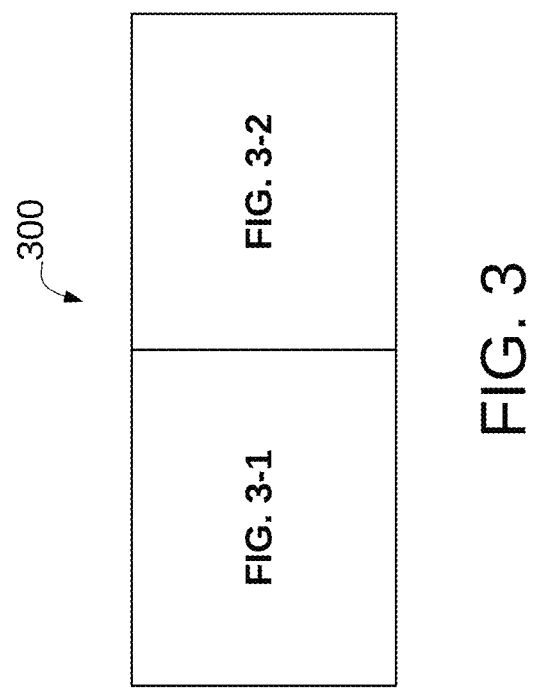
FIG. 3 shows the relationship between FIGS. 3-1 and 3-2, where FIGS. 3-1 and 3-2 together form a screenshot of a user interface employed with the checkbox extraction system.

In the following detailed description, reference will be made to the accompanying drawings, in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense.

Certain current techniques for automatically recognizing checkboxes within a document fall short in a number of ways. This is seen in FIGS. 6A and 6B where FIG. 6A shows images of checkboxes that are correctly recognized with conventional techniques, and FIG. 6B which shows images of checkboxes that are not correctly recognized with conventional techniques. Moreover, such techniques do not provide an integrated an end-to-end solution that includes robotic process automation capabilities, trained cognitive neural network model and a user interface that communicates checkbox extraction to business users.

FIG. 1 provides an overview of a system that automatically recognizes checkboxes within a document and extracts the contents thereof. In the embodiment of FIG. 1, user 102 views a digitized image of a document 104 (such as a PDF or TIFF file) and visually annotates the document 104 by identifying, by way of visually perceptible bounding boxes, checkboxes contained in the document that the user 102 wishes to be identified by the system 10. This is shown in further detail in FIG. 2 where bounding box 202 designates a label and bounding box 203 designates a pair of checkboxes, which are each bounded by a bounding box along with their associated label. The annotated document is processed by a machine learning engine 106 to train the engine to recognize desired checkboxes. The engine 106 may be trained by a relatively small set of training documents (~10), shown generally at 107, and the training may be validated by another relatively small set of validation documents, also shown generally at 107. The trained engine 106 may then be subsequently used in a software robot ("bot") 108 that is trained to recognize checkboxes in the document 104. The bot 108 may be retrieved from data storage 110 which stores a variety of trained bots that may be used to process different types of documents and automate other tasks that require cognitive recognition.

The trained bot 108 may be deployed by another user to process multiple documents 112 that are similar to document 104, in that they contain the types of checkboxes on which the bot 108 has been trained. In this respect the bot 108 can automate the extraction of information from a large volume of same or similar documents of which only the image is available, such as forms that may be employed by a business or government, as opposed to an encoded digital form of a document where the fields in the document may be programmatically recognized by an application program. A textually encoded representation of the recognized labels and values of the associated recognized checkboxes is stored in a document or database where they may be accessed for processing and manipulation by a software program.

FIG. 3 shows the relationship between FIGS. 3-1 and 3-2, where FIGS. 3-1 and 3-2 together form a screenshot of a user interface (UI) employed with the checkbox extraction system. FIG. 3-1 is a screenshot of a portion of a user interface generated by system 10 to permit user 102 to identify checkboxes in a document 104 (shown in FIG. 3-2) that the user 102 wishes to have automatically recognized. The UI 300 includes a left panel 302 used by the user 102 to identify and verify a label associated with a checkbox in the document 104, a center panel 303 to identify a data type (checkbox) and a right panel 304 to view the document 104. The fields shown in left panel 302 are field contained in document 104 that have been entered into the system 10. In the screenshot of FIG. 3-1 the user 102 selects a label and the associated data type is shown in center panel 303. The field US Yes is shown to have the datatype "checkbox" associated with it, which the user 102 may change. The value of the field US Yes is shown to not have a value, which the user 102 may also change. The user 102 is also able to designate whether the field US Yes is a checkbox group, as explained in further detail below. Turning to FIG. 3-2, the field designated as US Yes can be seen to have a label "Are you a United States Citizen?" which is designated by bounding box 306. Associated checkboxes are seen at 307 "Yes" and 308 "No" with each checkbox designated with a bounding box. The UI is also seen as providing a guidebox 309 to permit the user 102 to designate an area in which the system 10 generates a bounding box to surround an area of interest in this case the checkbox associated with the "Yes" answer. Additional bounding boxes are also shown in FIG. 3-2. The bounding boxes may correspond to a label or to one or more checkboxes. Checkboxes may be single, such as checkbox 308 that is associated with the label "Check if you do not have a TX drivers license". Other checkboxes may be part of a group such as seen with the other checkboxes in FIG. 3-2, such as the checkboxes 311 or the pair of checkboxes associated with the labels 306, or the three labels below label 306, or the checkboxes seen at 312. For a checkbox group, each checkbox in the group is recognized as an individual checkbox. For a single checkbox, the system first finds the label then crops the position of the rectangle (bounding box) for the label, then extracts the value for the label, then finds the rectangle for the associated checkbox, then extracts the value for the checkbox. For a checkbox group, there will be more than one checkbox. Each checkbox designated as part of the group is identified and the associated value is extracted. A checkbox group may have multiple bounding boxes, one bounding box surrounding all checkboxes of the group, and one bounding box per checkbox.

Figure 4:
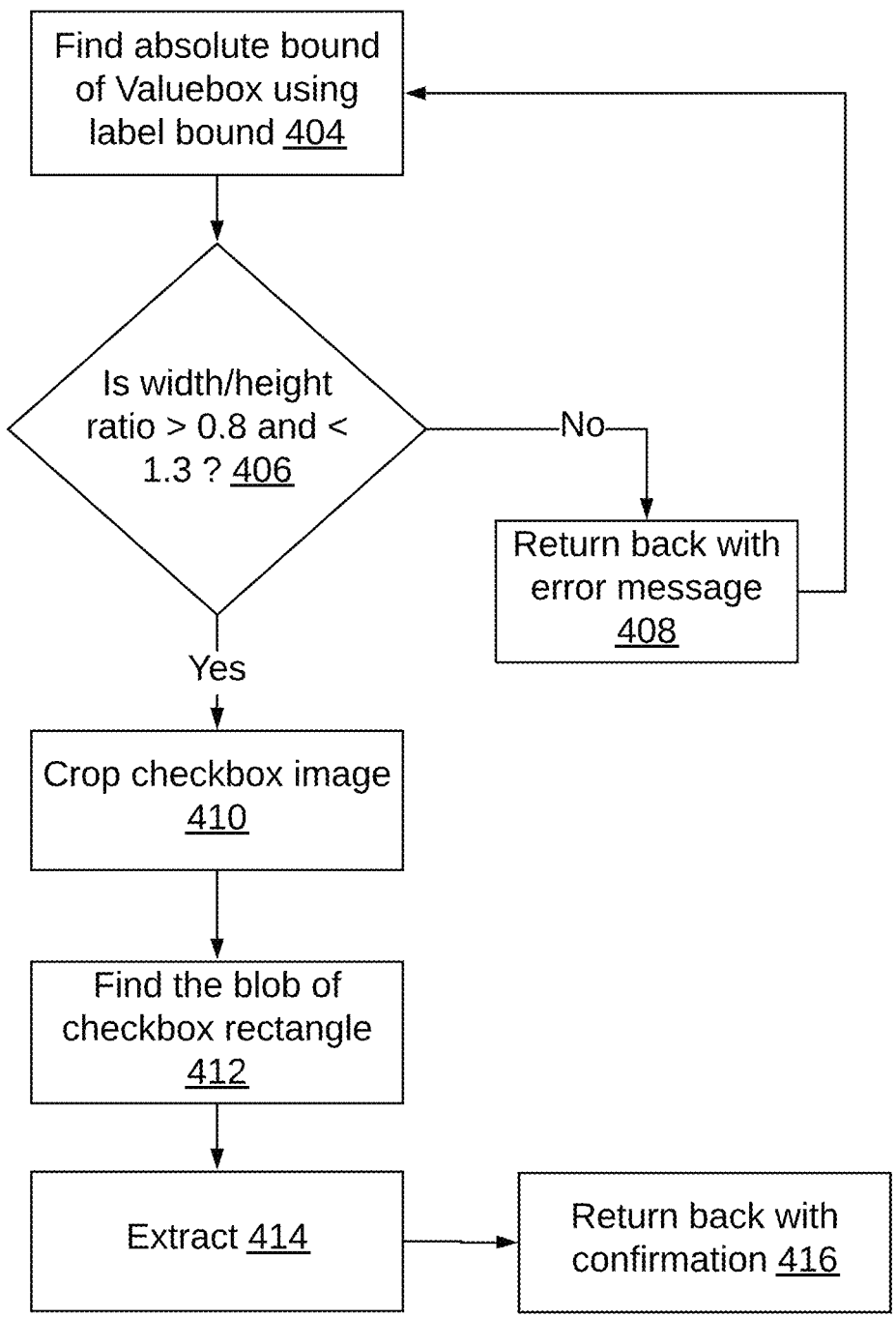
FIG. 4 is a flowchart illustrating operation of an embodiment of the checkbox extraction system.

FIG. 4 is a flowchart illustrating operation of an embodiment of the checkbox extraction system 10. The bot 108 processes a document 112 by scanning the document 112 (such as line by line scanning, left to right) to identify a boundary of a bounding box designated by way of the UI of FIG. 3. Once a bounding box has been identified, the aspect ratio is checked at 406 to determine if it is within a predetermined range, in this case if the width/height ratio greater than 0.8 and less than 1.3. If not, then an error message is provided at 408 and the bot continues scanning the image at 404. If the aspect ratio of the box is determined at 406 to be within the predetermined range, then at 410 the image within the bounding box is cropped to find at 412 the checkbox image. Once the checkbox image 412 has been identified, it is extracted at 414 for storage in 114 and a confirmatory response is provided at 416. The identified checkboxes and their contents are stored as label-value pairs, where the label identifies the checkbox and the value identifies the value of the checkbox, which can be either Yes, No, or No checkbox found.

Bounding boxes containing labels may be processed by known optical character recognition techniques. In one embodiment, the recognition of text in a bounding box may be performed as described in U.S. patent application Ser. No. 15/851,617, filed on Dec. 21, 2017, entitled OPTICAL CHARACTER RECOGNITION EMPLOYING DEEP LEARNING WITH MACHINE GENERATED TRAINING DATA, which application is assigned to the assignee of the present application and which application is hereby incorporated by reference in its entirety.

Identification of the blob of the checkbox rectangle at 412 is performed by the trained machine learning engine 106. In one embodiment the machine learning engine 106 takes the form of a VGG16 ImageNet Model which is a pre-trained image classification model that has been trained on more than 1000 categories containing ~1.2 million training images, 50K images for validation, and 100K images for testing. Further explanation of operation of the VGG16 ImageNet Model is provided in the publication, Very Deep Convolutional Networks for Large-Scale Image Recognition, by Karen Simonyan, Andrew Zisserman, (Submitted on 4 Sep. 2014 (v1), last revised 10 Apr. 2015 (this version, v6)) arXiv:1409.1556v6 [cs.CV], which is hereby incorporated by reference in its entirety.

The VGG16 ImageNet Model has been modified by adding several top layers including: a global average pooling layer, a fully connected layer with 1024 node and 'relu' activation, a fully connected layer with 2 node and 'softmax' activation. The modified ImageNet Model is shown in FIGS. 5A, 5B, 5C, 5D and 5E. The operations shown in FIGS. 5A, 5B, 5C and 5D are as described by Simonyan et al. referenced above. The original image 104 (for training) or 112 (for operational processing in a trained model) is processed by two convolutional+ReLU (Rectified Linear Unit) operations (504.1, 504.2). In FIGS. 5A, 5B, 5C, and 5D the parameters of the convolutional+ReLU operations 504.1-504.13 are shown with a four-dimensional kernel size of a convolutional layer as (width, height, input channels, output channels). The output channel corresponds to a bias of the layer.

A max pooling operation 506.1 is applied after the second convolution+ReLU operation 504.2, followed by two successive convolution+ReLU operations (504.3, 504.4). A max pooling operation 506.2 is then applied. Continuing in FIG. 5B, three successive conv+ReLU operations (504.5, 504.6, 504.7) are applied, followed by another max pooling operation 506.3. Continuing in FIG. 5C, three successive conv+ReLU operations (504.8, 504.9, 504.10) are applied, followed by another max pooling operation 506.4. Continuing to FIG. 5D, three successive conv+ReLU operations (504.11, 504.12, 504.13) followed by a final max pooling operation 506.5.

The final three layers as described by Simonyan et al., comprise, a softmax operation (which operates to flatten the output of the prior convolutional networks to reshape a 3-dimensional output of the convolutional network to a 1-dimensional output) followed by three fully connected layers (also sometimes referred to as dense layers)+ReLU operations. These have been replaced by the operations shown in FIG. 5E.

Figure 5A:
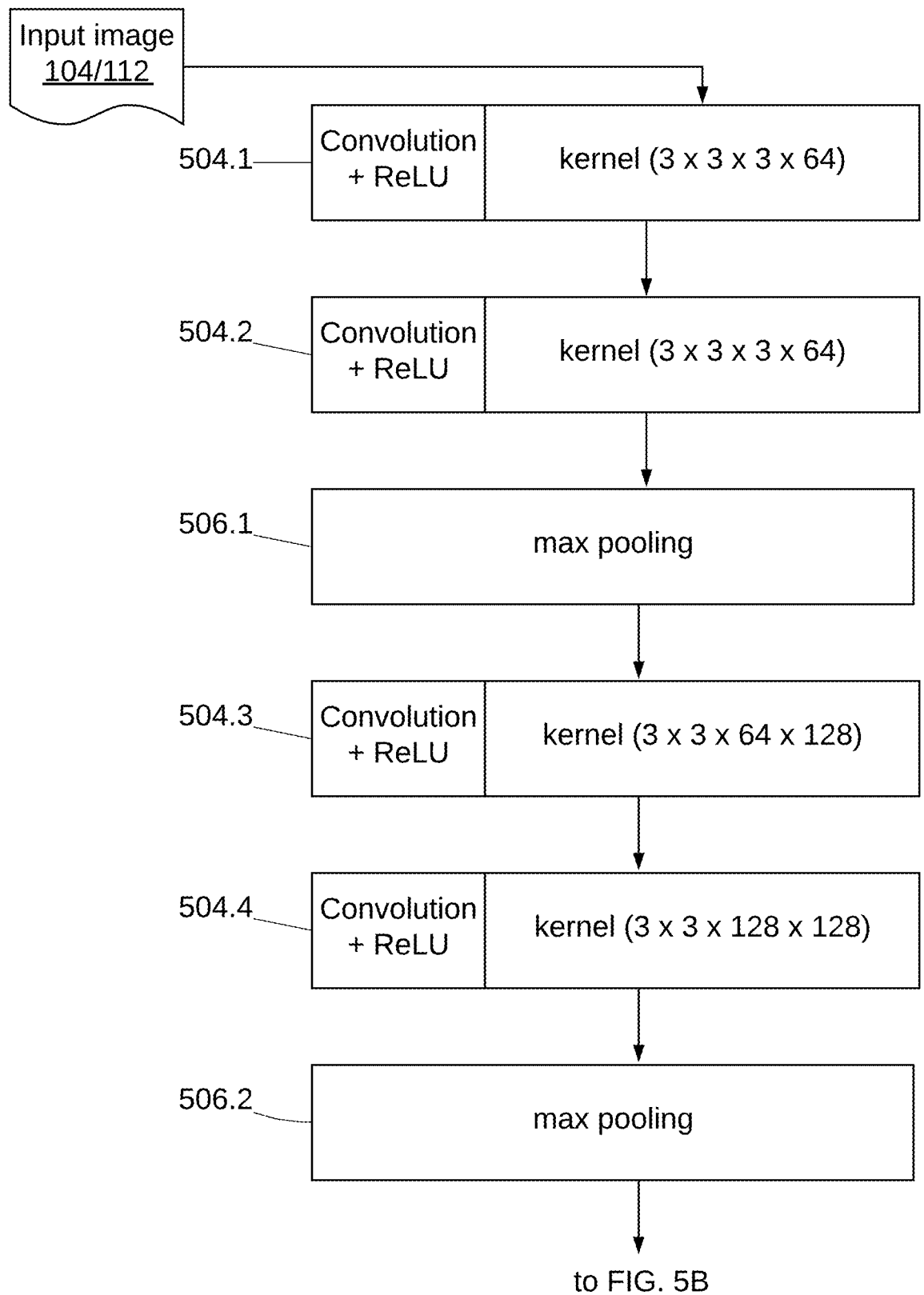
FIGS. 5A, 5B, 5C, 5D and 5E are block diagrams illustrating components of an embodiment of a machine learning engine employed by the checkbox extraction system.
Figure 5B:
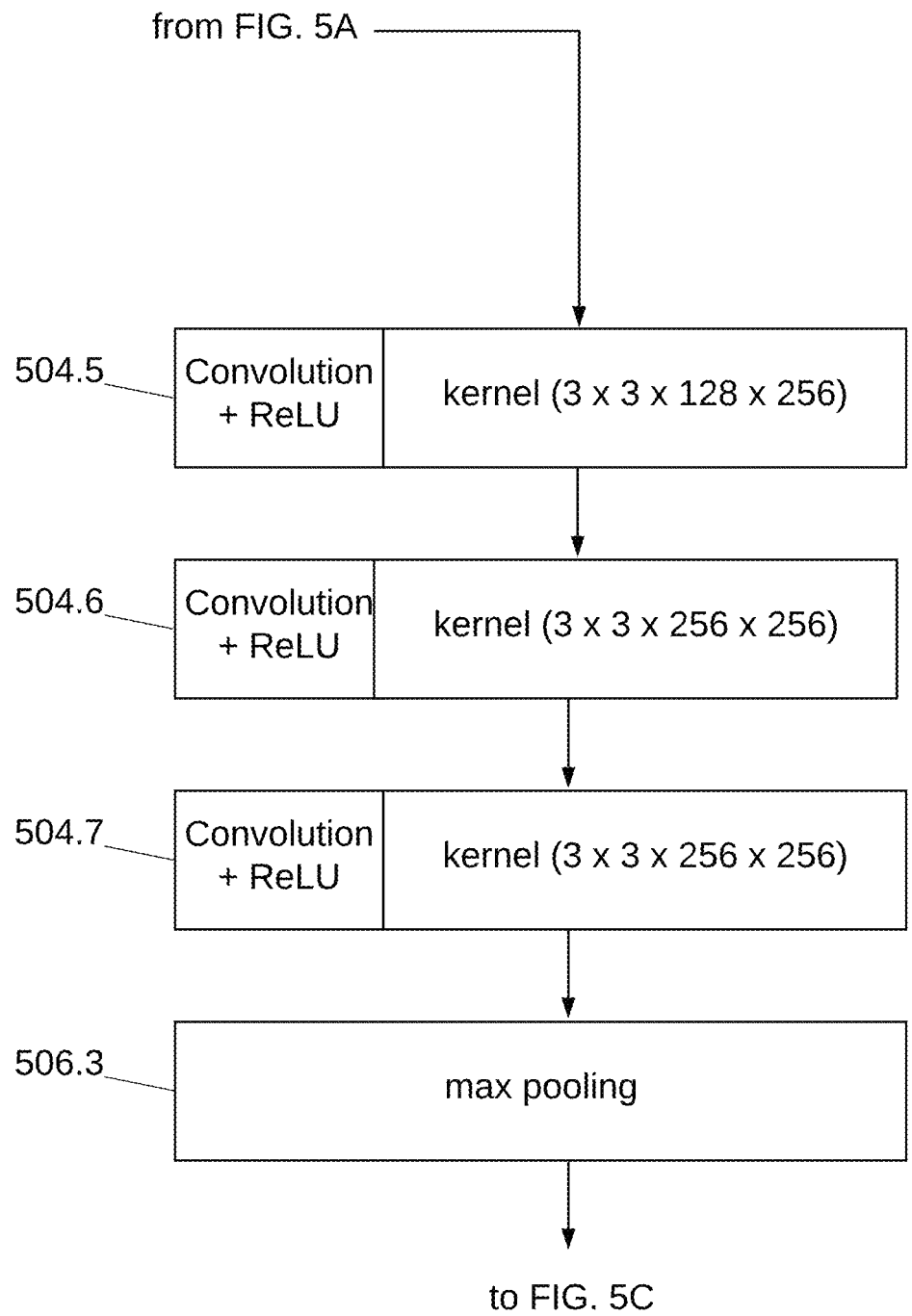
Figure 5C:
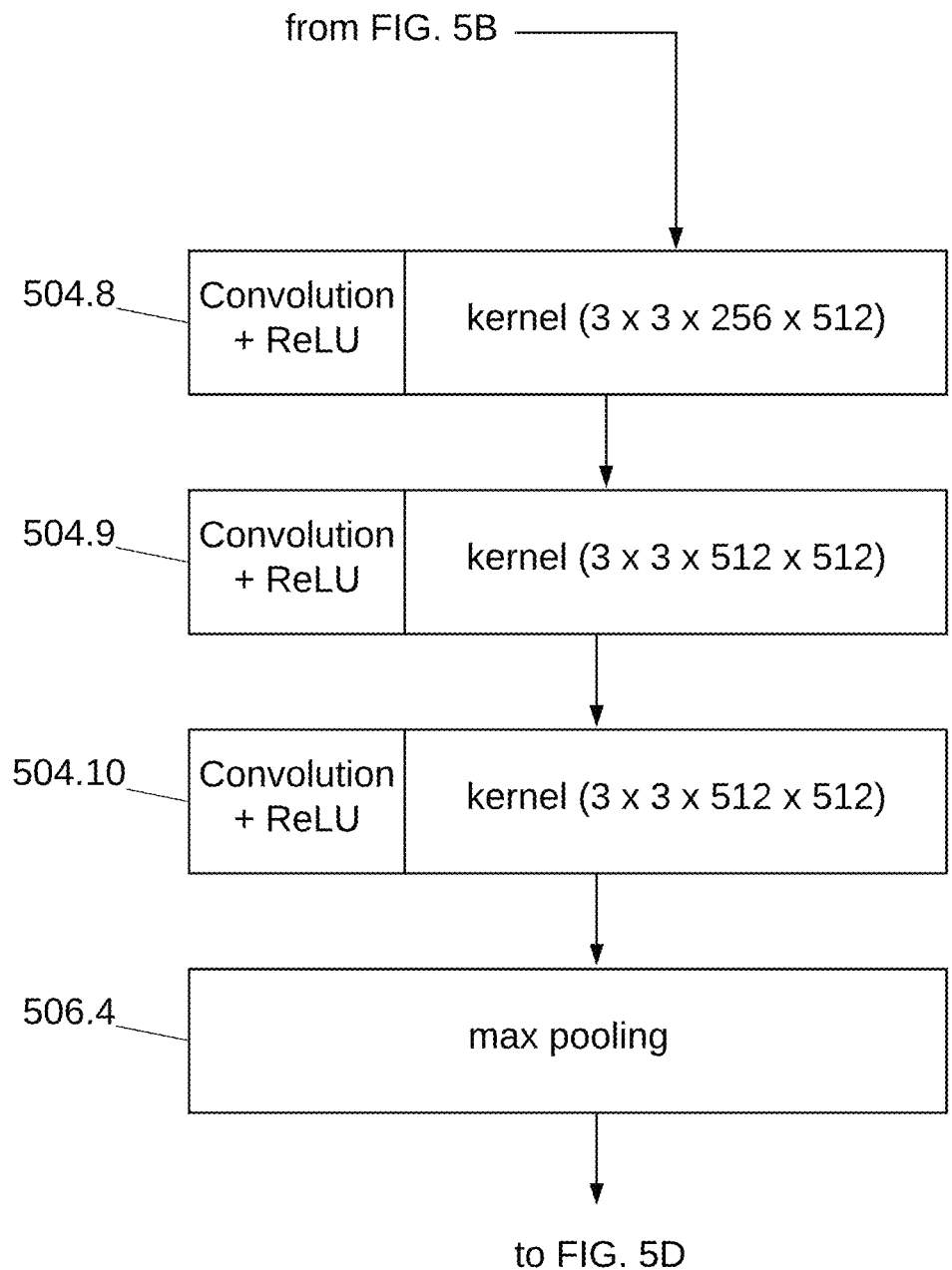
Figure 5D:
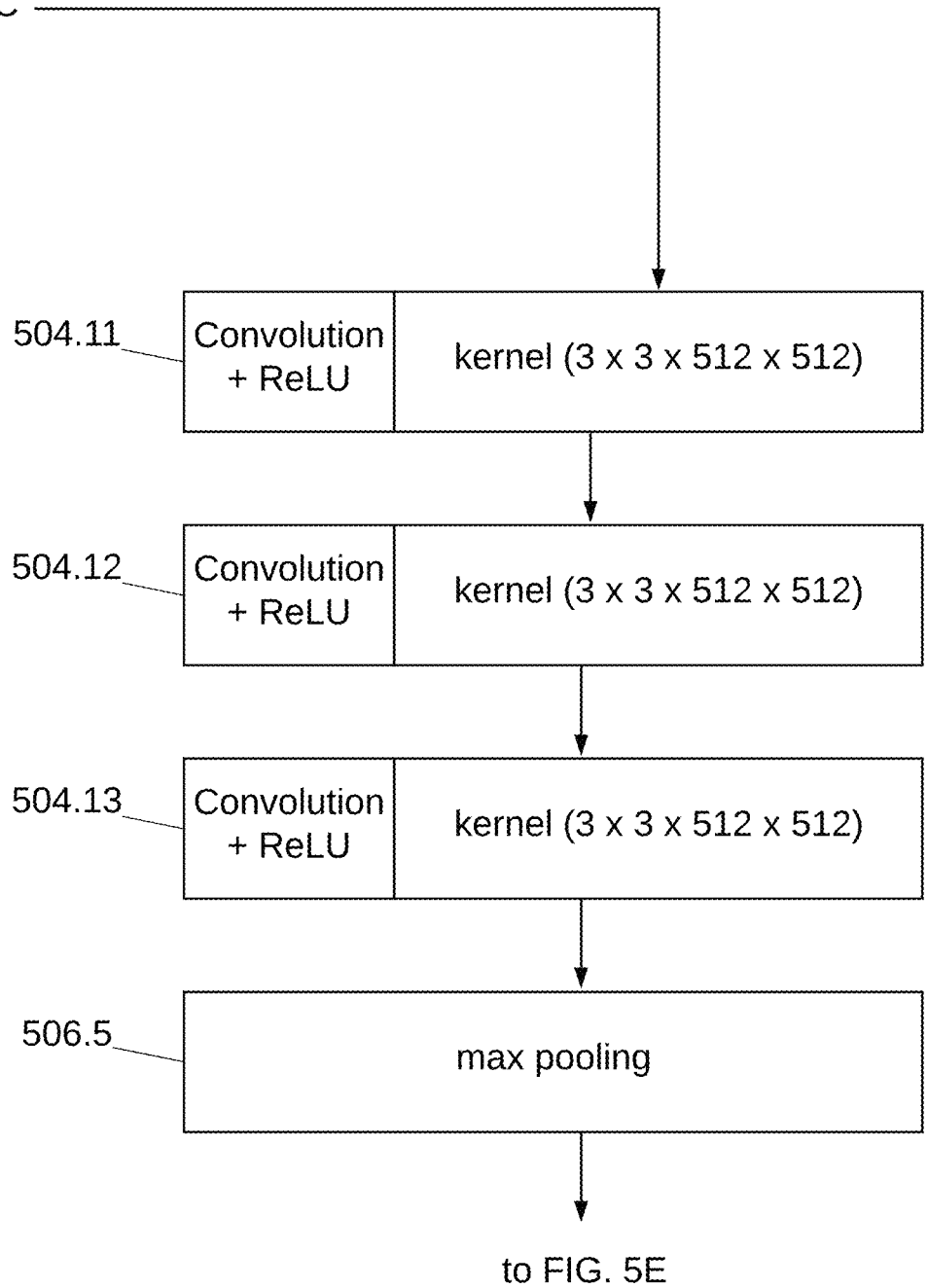
Figure 5E:
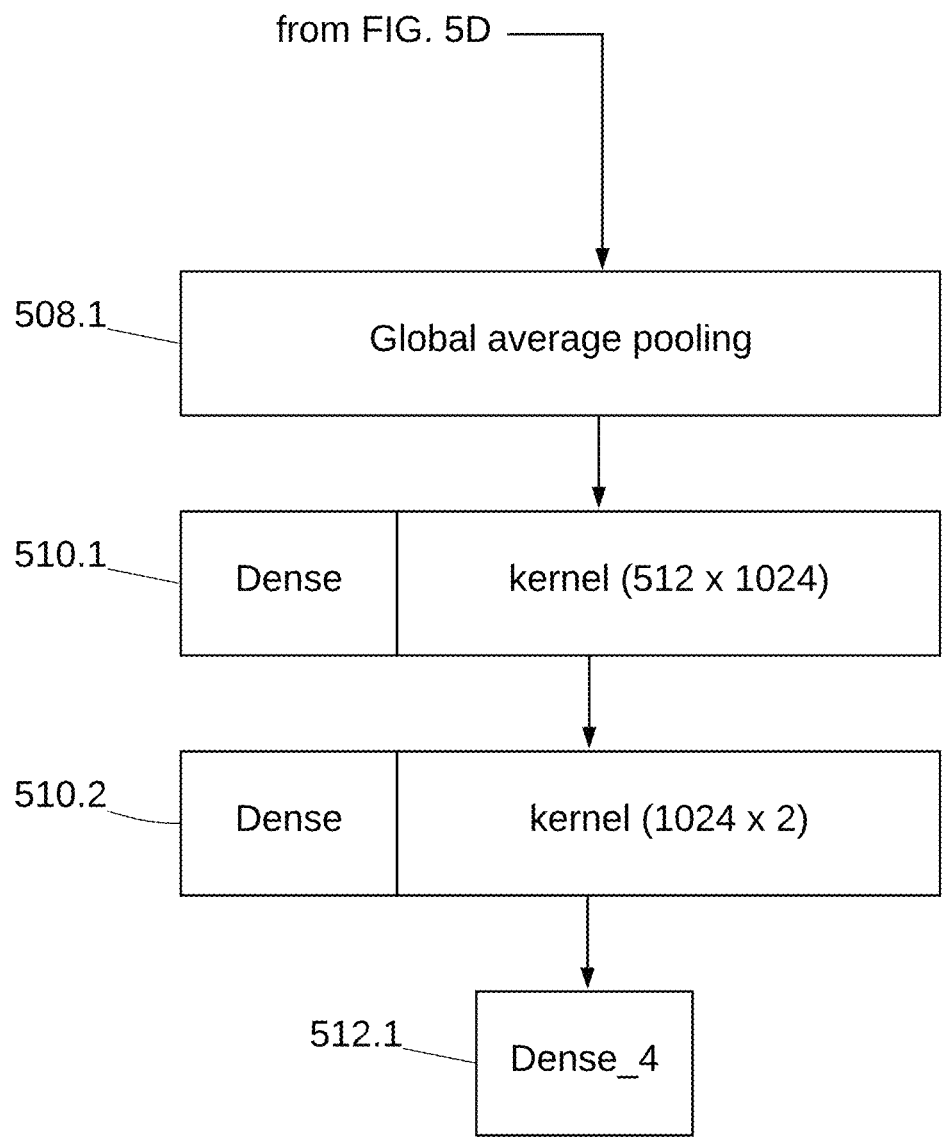
Figure 7:
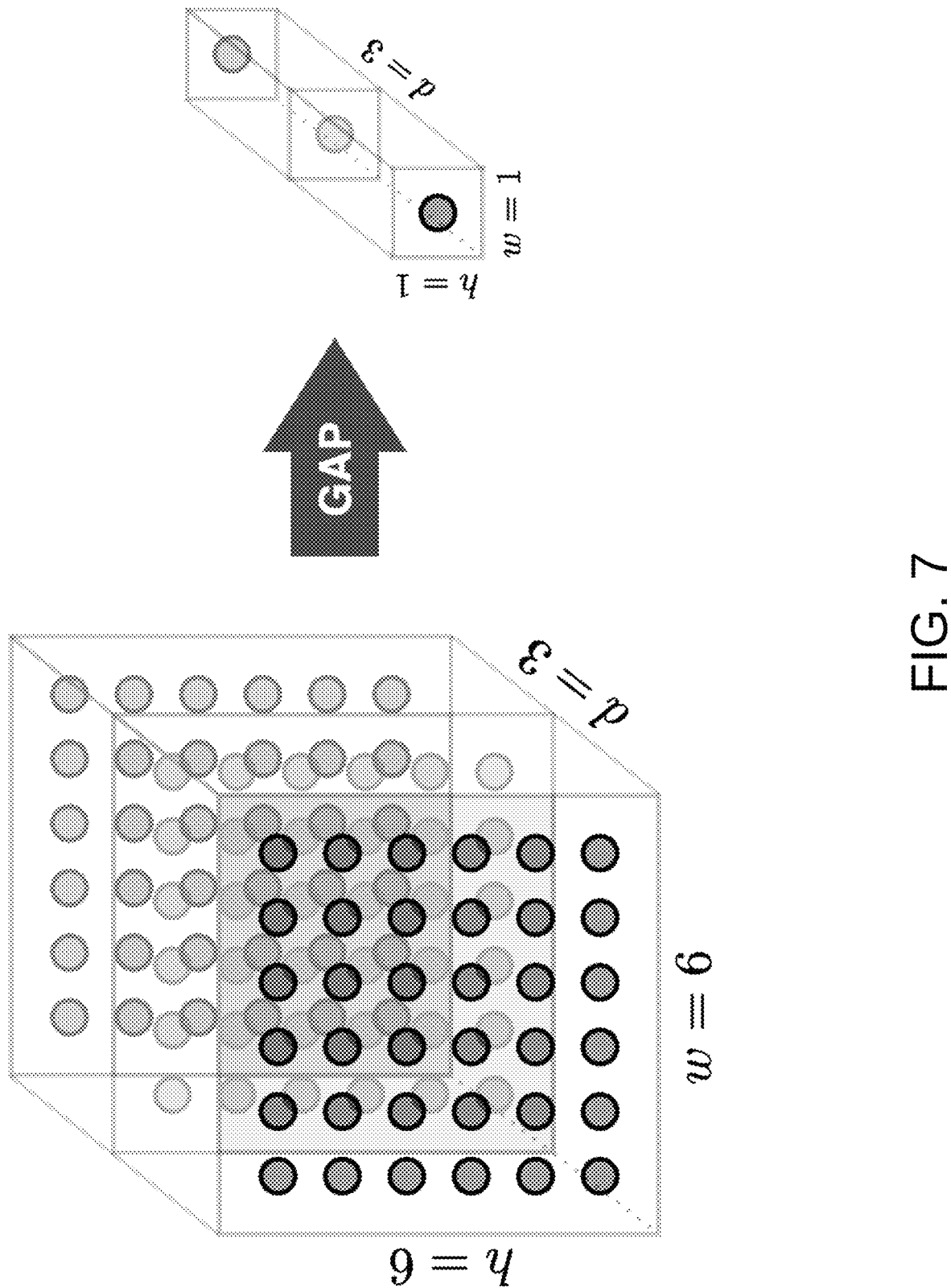
FIG. 7 is a block diagram illustrating operation of global average pooling.

As seen in FIG. 5E a global average pooling operation 508.1 is followed by two dense operations (fully connected+ ReLU) 510.1, 510.2 followed by a fully connected+softmax operation 512.1. The global average pooling operation 508.1 is performed as described in the publication, Network in Network, by Min Lin, Qiang Chen, Shuicheng Yan, arXiv: 1312.4400v3 [cs.NE] 4 Mar. 2014. As described by Alexis Cook at alexiscook.github.io, use of the global average pooling operation (GAP) 508.1 operates to minimize overfitting by reducing the total number of parameters in the model. GAP layers are similar to max pooling layers in that they are used to reduce the spatial dimensions of a three-dimensional tensor as shown in FIG. 7. However, GAP layers perform a more extreme type of dimensionality reduction, where a tensor with dimensions h×w×d is reduced in size to have dimensions 1×1×d. GAP layers reduce each h×w feature map to a single number by taking the average of all hw values. The fully connected operation identifies the high-level features that most strongly correlate to a particular class. Weights are employed to compute the products between the weights and the previous layer to generate probabilities for different classes. The fully connected layer takes an input volume and outputs an N dimensional vector where N is the number of classes that must be chosen from.

The convolution operation operates as a filter. A filter matrix is applied to an image. A value of a central pixel is determined by adding the weighted values of all its neighbors together. The output is a new modified filtered image. The convolution is performed by moving a kernel (with parameters as shown in FIGS. 5A-5D) over the image, so as to move the kernel through all the positions where the kernel fits entirely within the boundaries of the image. Each kernel position corresponds to a single output pixel, the value of which is calculated by multiplying together the kernel value and the underlying image pixel value for each of the cells in the kernel, and then adding all these numbers together.

The ReLU operation is a commonly used activation function and mathematically is defined as $y=\max(0, x)$. In general, the ReLU operation is computationally efficient thereby taking less training and running time. ReLU also converges rapidly and is sparsely activated as it is zero for all negative inputs, therefore it is more likely that any given unit will not activate at all which leads to more concise models that have better predictive power and less overfitting/noise. The softmax function assigns decimal probabilities to each class in a multi-class problem, where the decimal probabilities add up to 1.0. This constraint helps training converge more quickly than it otherwise would.

Max pooling is a sample-based discretization process which operates to down-sample an input representation (image, hidden-layer output matrix, etc.), reducing its dimensionality and allowing for assumptions to be made about features contained in the sub-regions binned. This is done to in part to help over-fitting by providing an abstracted form of the representation. It also reduces the computational cost by reducing the number of parameters to learn and provides basic translation invariance to the internal representation. Max pooling is performed by applying a max filter to (usually) non-overlapping subregions of the initial representation.

Initial testing on a limited data set has shown that the aforementioned changes to the VGG16 ImageNet Model result in improved recognition of checkboxes in a variety of applications. In such testing, a confusion matrix was generated. As will be appreciated by those skilled in the art, a confusion matrix is a table that is often used to describe the performance of a classification model (or "classifier") on a set of test data for which the true values are known. The model has been shown to perform well on samples it's familiar with, and not as well on samples it's not yet familiar with. As more labeled data is included, the model can be retrained, increasing its generalizability to recognize checkmarks across more cases.

The trained bots may be employed in a Robotic Process Automation (RPA) system such as available from Automation Anywhere, Inc. Such an RPA system implements a bot creator that may be used by a RPA user, to create one or more bots that are used to automate various business processes executed by one or more computer applications. The term "bot" as used herein refers to a set of instructions that cause a computing resource to interact with one or more user level computer applications to perform tasks provided by the one or more user level computer applications. Once created, the bot may be employed to perform the tasks as encoded by the instructions to interact with one or more user level computer applications.

In certain environments, the information provided by an application may contain sensitive information, the distribution or viewing of which may be subject to various regulatory or other restrictions. In such an environment, as described in U.S. patent application "DETECTION AND DEFINITION OF VIRTUAL OBJECTS IN REMOTE SCREENS", Ser. No. 15/957,030, filed on Apr. 19, 2018, which application is hereby incorporated by reference in its entirety, an automation controller, resident on a computer system operates in conjunction with an RPA system to interact with another, remote, computer system. The RPA system sends automation commands and queries to the automation controller, while respecting the security compliance protocols of the remote computer system. As described, a compliance boundary may be implemented in connection with a remote access module. The compliance boundary represents a logical boundary, across which, any transfer of data or other information is controlled by agreements between parties. In certain embodiments, the remote access module may operate to prevent the RPA user from performing certain tasks on the remote system, by way of example and not limitation, copying files, loading cookies, or transmitting data from the remote computer system, through or beyond the compliance boundary via the internet or via any other output device that would violate the security protocols established by the remote computer system. The remote access module may take the form of remote desktop products available from Citrix or Microsoft, which permit connection to a remote computer, to establish a communication link between the user's system and the remote system to permit apps, files, and network resources to be made available. The system 10 described herein may be employed in the above described environment to permit recognition of the application controls provided by the application accessed across the aforementioned compliance boundary.

Figure 8:
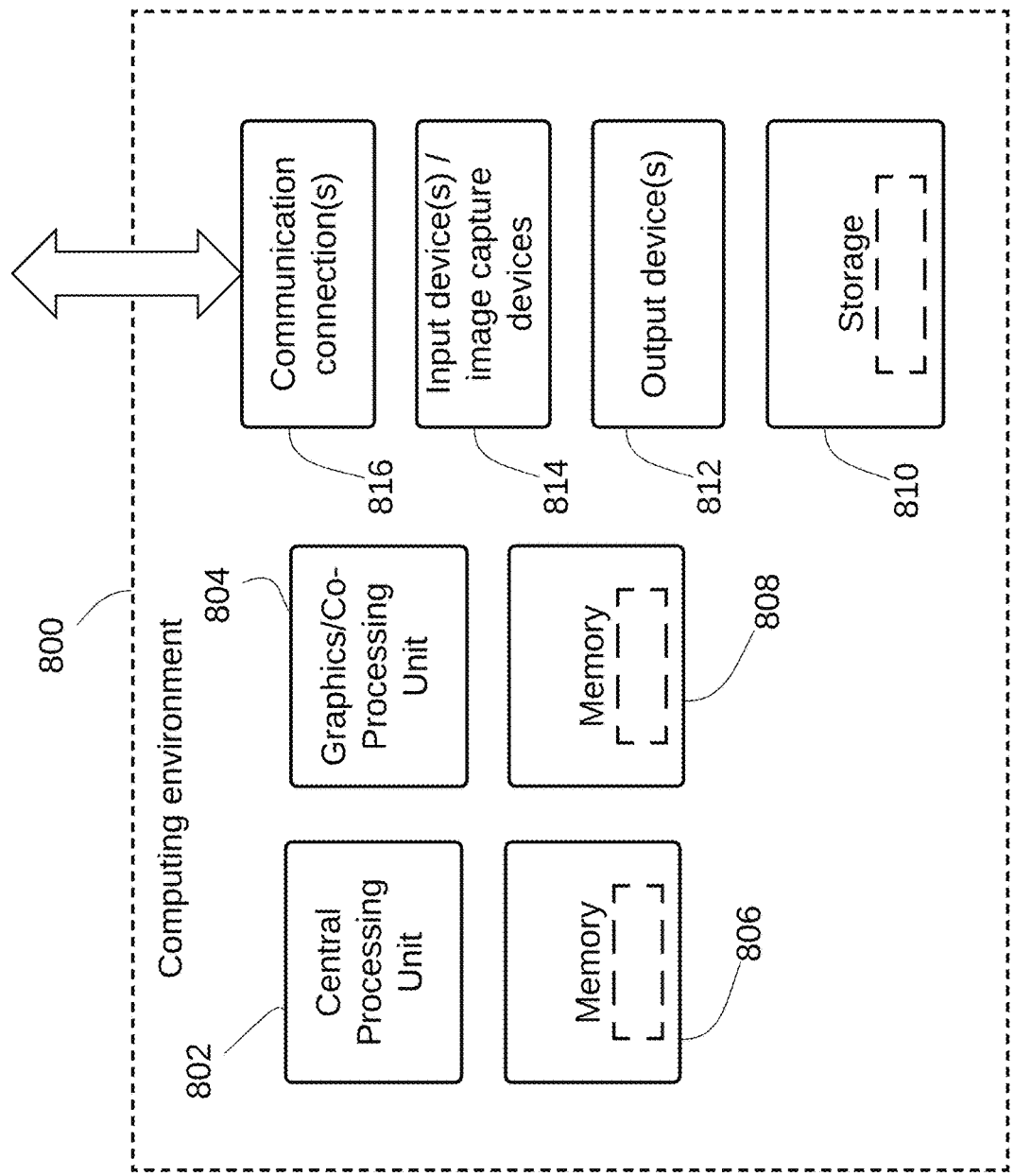
FIG. 8 illustrates a block diagram of hardware that may be employed in an implementation of the systems disclosed herein.

FIG. 8 illustrates a block diagram of hardware that may be employed in an implementation of the RPA system as disclosed herein. FIG. 8 depicts a generalized example of a suitable general-purpose computing system 800 in which the described innovations may be implemented in order to improve the processing speed and efficiency with which the computing system 800 operates to perform the functions disclosed herein. With reference to FIG. 8 the computing system 800 includes one or more processing units 802, 804 and memory 806, 808. The processing units 802, 806 execute computer-executable instructions. A processing unit can be a general-purpose central processing unit (CPU), processor in an application-specific integrated circuit (ASIC) or any other type of processor. The tangible memory 806, 808 may be volatile memory (e.g., registers, cache, RAM), non-volatile memory (e.g., ROM, EEPROM, flash memory, etc.), or some combination of the two, accessible by the processing unit(s). The hardware components in FIG. 8 may be standard hardware components, or alternatively, some embodiments may employ specialized hardware components to further increase the operating efficiency and speed with which the system 10 operates. The various components of computing system 800 may be rearranged in various embodiments, and some embodiments may not require nor include all of the above components, while other embodiments may include additional components, such as specialized processors and additional memory.

Computing system 800 may have additional features such as for example, storage 810, one or more input devices 814, one or more output devices 812, and one or more communication connections 816. An interconnection mechanism (not shown) such as a bus, controller, or network interconnects the components of the computing system 800. Typically, operating system software (not shown) provides an operating system for other software executing in the computing system 800, and coordinates activities of the components of the computing system 800.

The tangible storage 810 may be removable or non-removable, and includes magnetic disks, magnetic tapes or cassettes, CD-ROMs, DVDs, or any other medium which can be used to store information in a non-transitory way, and which can be accessed within the computing system 800. The storage 810 stores instructions for the software implementing one or more innovations described herein.

The input device(s) 814 may be a touch input device such as a keyboard, mouse, pen, or trackball, a voice input device, a scanning device, or another device that provides input to the computing system 800. For video encoding, the input device(s) 814 may be a camera, video card, TV tuner card, or similar device that accepts video input in analog or digital form, or a CD-ROM or CD-RW that reads video samples into the computing system 800. The output device(s) 812 may be a display, printer, speaker, CD-writer, or another device that provides output from the computing system 800.

The communication connection(s) 816 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The terms "system" and "computing device" are used interchangeably herein. Unless the context clearly indicates otherwise, neither term implies any limitation on a type of computing system or computing device. In general, a computing system or computing device can be local or distributed and can include any combination of special-purpose hardware and/or general-purpose hardware with software implementing the functionality described herein.

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims.

What is claimed is:

1. A computerized method for identifying a checkbox in a digitized image of a document comprising:
receiving an input image comprising a portion of a digitized image of a document, wherein the digitized image includes one or more checkboxes;
processing the input image sequentially with a first convolutional layer having a first bias setting, a second convolutional layer having a second bias setting, and a first max pooling layer to generate a first processed input image;
processing the first processed input image sequentially with a third convolutional layer having a third bias setting, a fourth convolutional layer having a fourth bias setting, and a second max pooling layer to generate a second processed image, wherein the third bias setting and the fourth bias setting are each greater than the first bias setting and the second bias setting;
processing the second processed input image sequentially with a fifth convolutional layer having a fifth bias setting, a sixth convolutional layer having a sixth bias setting, a seventh convolutional layer having a seventh bias setting and a third max pooling layer to generate a third processed image, wherein the fifth bias setting the sixth bias setting and the seventh bias setting are each greater than the third bias setting and the fourth bias setting;

processing the third processed input image sequentially with an eighth convolutional layer having an eighth bias setting, a ninth convolutional layer having a ninth bias setting, a tenth convolutional layer having a tenth bias setting and a fourth max pooling layer to generate a fourth processed image, wherein the eighth bias setting, the ninth bias setting and the tenth bias setting are each greater than the fifth bias setting, the sixth bias setting and the seventh bias setting;

processing the fourth processed input image sequentially with an eleventh convolutional layer having an eleventh bias setting, a twelfth convolutional layer having a twelfth bias setting, a thirteenth convolutional layer having a thirteenth bias setting and a fifth max pooling layer to generate a fifth processed image, wherein the eleventh bias setting, the twelfth bias setting and the thirteenth bias setting are each equal to the eighth, ninth and tenth bias settings;

processing the fifth processed image with a global average pooling layer to generate a sixth processed image;

processing the sixth processed image sequentially with first and second fully connected+ReLU operations to generate a seventh processed image; and processing the seventh processed image with a fully connected softmax layer to identify a checkbox within the seventh processed image.

2. The computerized method of claim 1 further comprising saving to a data structure a value corresponding to image information in the checkbox that indicates a value within the checkbox.

3. The computerized method of claim 1 comprising generating the input image by:

processing the digitized image of the document to identify one or more bounding boxes generated by a user, wherein each of the one or more bounding boxes visually defines a rectangular area in the digitized image of the document containing a checkbox; and generating the input image by generating a copy of a portion of the digitized image of the document that contains at least one of the bounding boxes.

4. The computerized method of claim 1 comprising generating the input image by:

processing the digitized image of the document to identify one or more bounding boxes generated by a user, wherein each of the one or more bounding boxes visually defines a rectangular area in the digitized image of the document containing a checkbox;

determining an aspect ratio of each bounding box; and generating the input image to contain one of the bounding boxes if the aspect ratio of the one of the bounding boxes is within a predetermined ratio by generating a copy of a portion of the digitized image of the document that contains at least the one of the bounding boxes.

5. The computerized method of claim 1 wherein:
the first bias setting is equal to the second bias setting;
the third bias setting is equal to the fourth bias setting;
the fifth bias setting is equal to the sixth bias setting and the sixth bias setting is equal to the seventh bias setting;
the eighth bias setting is equal to the ninth bias setting and the ninth bias setting is equal to the tenth bias setting; and
the eleventh bias setting is equal to the twelfth bias setting and the twelfth bias setting is equal to the thirteenth bias setting.

6. The computerized method of claim 1 wherein:
the first bias setting is equal to the second bias setting;
the third bias setting is twice that of the first and the second bias setting and is equal to the fourth bias setting;
the fifth bias setting is twice that of the third and the fourth bias setting and is equal to the sixth bias setting and the sixth bias setting is equal to the seventh bias setting;
the eighth bias setting is twice that of the fifth, sixth and seventh bias setting and is equal to the ninth bias setting and the ninth bias setting is equal to the tenth bias setting; and
the eleventh bias setting is twice that of the eighth, ninth and tenth bias setting and is equal to the twelfth bias setting and the twelfth bias setting is equal to the thirteenth bias setting.

7. A robotic process automation system comprising:
data storage for storing a plurality of bounding box images, the bounding box images extracted from a set of document images and characterized as a label bounding box or a checkbox bounding box;
a processor operatively coupled to the data storage and configured to execute instructions that when executed cause the processor to identify a checkbox in a checkbox bounding box by:
receiving a bounding box image containing a checkbox bounding box,
processing the bounding box image sequentially with a first convolutional layer having a first bias setting, a second convolutional layer having a second bias setting, and a first max pooling layer to generate a first processed bounding box image;
processing the first processed bounding box image sequentially with a third convolutional layer having a third bias setting, a fourth convolutional layer having a fourth bias setting, and a second max pooling layer to generate a second processed bounding box image, wherein the third bias setting and the fourth bias setting are each greater than the first bias setting and the second bias setting;
processing the second processed bounding box image sequentially with a fifth convolutional layer having a fifth bias setting, a sixth convolutional layer having a sixth bias setting, a seventh convolutional layer having a seventh bias setting and a third max pooling layer to generate a third processed image, wherein the fifth bias setting the sixth bias setting and the seventh bias setting are each greater than the third bias setting and the fourth bias setting;
processing the third processed bounding box image sequentially with an eighth convolutional layer having an eighth bias setting, a ninth convolutional layer having a ninth bias setting, a tenth convolutional layer having a tenth bias setting and a fourth max pooling layer to generate a fourth processed image, wherein the eighth bias setting, the ninth bias setting and the tenth bias setting are each greater than the fifth bias setting, the sixth bias setting and the seventh bias setting;
processing the fourth processed bounding box image sequentially with an eleventh convolutional layer having an eleventh bias setting, a twelfth convolutional layer having a twelfth bias setting, a thirteenth convolutional layer having a thirteenth bias setting and a fifth max pooling layer to generate a fifth processed image, wherein the eleventh bias setting, the twelfth bias setting and the thirteenth bias setting are each equal to the eighth, ninth and tenth bias settings;

processing the fifth processed bounding box with a global average pooling layer to generate a sixth processed bounding box image;

processing the sixth processed bounding box image sequentially with first and second fully connected+ReLU operations to generate a seventh processed bounding box image; and processing the seventh processed bounding box image with a fully connected softmax layer to identify a checkbox within the seventh processed bounding box image.

8. The robotic process automation system of claim 7 wherein the processor is further programmed with instructions that cause the processor to save to a data structure a value corresponding to image information in the checkbox that indicates a value within the checkbox.

9. The robotic process automation system of claim 7 comprising generating the bounding box image by:

processing a digitized image of a selected one of the document images to identify one or more bounding boxes generated by a user, wherein each of the one or more bounding boxes visually defines a rectangular area containing a checkbox in the digitized image of the selected one of the document images; and generating the bounding box image by generating a copy of a portion of the selected one of the document images that contains at least one of the bounding boxes.

10. The robotic process automation system of claim 7 comprising generating the bounding box image by:

processing a digitized image of a selected one of the document images to identify one or more bounding boxes generated by a user, wherein each of the one or more bounding boxes visually defines a rectangular area containing a checkbox in the digitized image of the selected one of the document images;

determining an aspect ratio of each bounding box; and generating the bounding box image to contain one of the bounding boxes if the aspect ratio of the one of the bounding boxes is within a predetermined ratio by generating a copy of a portion of the selected one of the document images that contains at least one of the bounding boxes.

11. The robotic process automation system of claim 7 wherein:

the first bias setting is equal to the second bias setting;

the third bias setting is equal to the fourth bias setting;

the fifth bias setting is equal to the sixth bias setting and the sixth bias setting is equal to the seventh bias setting;

the eighth bias setting is equal to the ninth bias setting and the ninth bias setting is equal to the tenth bias setting; and the eleventh bias setting is equal to the twelfth bias setting and the twelfth bias setting is equal to the thirteenth bias setting.

12. The robotic process automation system of claim 7 wherein:

the first bias setting is equal to the second bias setting;

the third bias setting is twice that of the first and the second bias setting and is equal to the fourth bias setting;

the fifth bias setting is twice that of the third and the fourth bias setting and is equal to the sixth bias setting and the sixth bias setting is equal to the seventh bias setting;

the eighth bias setting is twice that of the fifth, sixth and seventh bias setting and is equal to the ninth bias setting and the ninth bias setting is equal to the tenth bias setting; and the eleventh bias setting is twice that of the eighth, ninth and tenth bias setting and is equal to the twelfth bias setting and the twelfth bias setting is equal to the thirteenth bias setting.

13. A non-transitory tangible storage medium, having stored thereupon one or more program modules comprising computer-executable instructions for execution on a computer system, the computer-executable instructions causing the computer system to identify in a digitized image of a document a checkbox that is visually identified by a user by annotating the digitized image of the document with a rectangular marking that bounds a checkbox in the digitized image of the document, the computer-executable instructions causing the computer system to perform the operations of:

receiving a bounding box image containing a checkbox bounding box, the bounding box image extracted from a set of document images and characterized as a label bounding box or a checkbox bounding box;

processing the bounding box image sequentially with a first convolutional layer having a first bias setting, a second convolutional layer having a second bias setting, and a first max pooling layer to generate a first processed bounding box image;

processing the first processed bounding box image sequentially with a third convolutional layer having a third bias setting, a fourth convolutional layer having a fourth bias setting, and a second max pooling layer to generate a second processed bounding box image, wherein the third bias setting and the fourth bias setting are each greater than the first bias setting and the second bias setting;

processing the second processed bounding box image sequentially with a fifth convolutional layer having a fifth bias setting, a sixth convolutional layer having a sixth bias setting, a seventh convolutional layer having a seventh bias setting and a third max pooling layer to generate a third processed image, wherein the fifth bias setting the sixth bias setting and the seventh bias setting are each greater than the third bias setting and the fourth bias setting;

processing the third processed bounding box image sequentially with an eighth convolutional layer having an eighth bias setting, a ninth convolutional layer having a ninth bias setting, a tenth convolutional layer having a tenth bias setting and a fourth max pooling layer to generate a fourth processed image, wherein the eighth bias setting, the ninth bias setting and the tenth bias setting are each greater than the fifth bias setting, the sixth bias setting and the seventh bias setting;

processing the fourth processed bounding box image sequentially with an eleventh convolutional layer having an eleventh bias setting, a twelfth convolutional layer having a twelfth bias setting, a thirteenth convolutional layer having a thirteenth bias setting and a fifth max pooling layer to generate a fifth processed image, wherein the eleventh bias setting, the twelfth bias setting and the thirteenth bias setting are each equal to the eighth, ninth and tenth bias settings;

processing the fifth processed bounding box with a global average pooling layer to generate a sixth processed bounding box image;

processing the sixth processed bounding box image sequentially with first and second fully connected+ReLU operations to generate a seventh processed bounding box image; and processing the seventh processed bounding box image with a fully connected softmax layer to identify a checkbox within the seventh processed bounding box image.

14. The non-transitory tangible storage medium of claim 13 wherein the computer-executable instructions further cause the computer system to save to a data structure a value corresponding to image information in the checkbox that indicates a value within the checkbox.

15. The non-transitory tangible storage medium of claim 13 wherein the computer-executable instructions further cause the computer system to generate the bounding box image by:

processing a digitized image of a selected one of the document images to identify one or more bounding boxes generated by a user, wherein each of the one or more bounding boxes visually defines a rectangular area containing a checkbox in the digitized image of the selected one of the document images; and generating the bounding box image by generating a copy of a portion of the selected one of the document images that contains at least one of the bounding boxes.

16. The non-transitory tangible storage medium of claim 13 wherein the computer-executable instructions further cause the computer system to generate the bounding box image by:

processing a digitized image of a selected one of the document images to identify one or more bounding boxes generated by a user, wherein each of the one or more bounding boxes visually defines a rectangular area containing a checkbox in the digitized image of the selected one of the document images;

determining an aspect ratio of each bounding box; and generating the bounding box image to contain one of the bounding boxes if the aspect ratio of the one of the bounding boxes is within a predetermined ratio by generating a copy of a portion of the selected one of the document images that contains at least one of the bounding boxes.

17. The non-transitory tangible storage medium of claim 13 wherein:

the first bias setting is equal to the second bias setting;

the third bias setting is equal to the fourth bias setting;

the fifth bias setting is equal to the sixth bias setting and the sixth bias setting is equal to the seventh bias setting;

the eighth bias setting is equal to the ninth bias setting and the ninth bias setting is equal to the tenth bias setting; and the eleventh bias setting is equal to the twelfth bias setting and the twelfth bias setting is equal to the thirteenth bias setting.

18. The non-transitory tangible storage medium of claim 13 wherein: the first bias setting is equal to the second bias setting; the third bias setting is twice that of the first and the second bias setting and is equal to the fourth bias setting; the fifth bias setting is twice that of the third and the fourth bias setting and is equal to the sixth bias setting and the sixth bias setting is equal to the seventh bias setting; the eighth bias setting is twice that of the fifth, sixth and seventh bias setting and is equal to the ninth bias setting and the ninth bias setting is equal to the tenth bias setting; and the eleventh bias setting is twice that of the eighth, ninth and tenth bias setting and is equal to the twelfth bias setting and the twelfth bias setting is equal to the thirteenth bias setting.

* * * * *